United States Patent
Osawa

(10) Patent No.: US 10,057,514 B2
(45) Date of Patent: Aug. 21, 2018

(54) IMAGE SENSOR HAVING REDUCED POWER CONSUMPTION

(71) Applicant: OLYMPUS CORPORATION, Hachioji-shi, Tokyo (JP)

(72) Inventor: Masato Osawa, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/297,685

(22) Filed: Oct. 19, 2016

(65) Prior Publication Data

US 2017/0041558 A1    Feb. 9, 2017

Related U.S. Application Data

(63) Continuation of application No. PCT/JP2015/050118, filed on Jan. 6, 2015.

(30) Foreign Application Priority Data

May 19, 2014    (JP) .................................. 2014-103571

(51) Int. Cl.
*H04N 5/335* (2011.01)
*H04N 5/341* (2011.01)
(Continued)

(52) U.S. Cl.
CPC ........... *H04N 5/341* (2013.01); *H04N 5/3698* (2013.01); *H04N 5/376* (2013.01); *H04N 5/378* (2013.01);
(Continued)

(58) Field of Classification Search
CPC ............................. H04N 5/341; H04N 5/3698
(Continued)

(56) References Cited

U.S. PATENT DOCUMENTS

| 7,324,144 B1 * | 1/2008 | Koizumi ................ H04N 5/355 348/294 |
| 2004/0080647 A1 | 4/2004 | Inui et al. |
| 2011/0242380 A1 * | 10/2011 | Ogura ................. H03F 3/45188 348/300 |

FOREIGN PATENT DOCUMENTS

| JP | 9-55890 A | 2/1997 |
| JP | 2003-234963 A | 8/2003 |
| JP | 2008-306695 A | 12/2008 |

OTHER PUBLICATIONS

International Search Report dated Mar. 10, 2015, issued in counterpart International Application No. PCT/JP2015/050118, w/English translation (2 pages).

* cited by examiner

*Primary Examiner* — Usman Khan
(74) *Attorney, Agent, or Firm* — Westerman, Hattori, Daniels & Adrian, LLP

(57) ABSTRACT

An image sensor includes n light receiving elements including first to n-th light receiving elements, each of the light receiving elements generating photoelectric conversion signals, n sequencers including first to n-th sequencers, each of the sequencers having both a sequencer input terminal to which a k-th horizontal control signal is input, and a sequencer output terminal from which a (k+1)-th horizontal control signal is output, and n switches including first to n-th switches, each of the switches having a switch input terminal to which a signal corresponding to the photoelectric conversion signal is input, a switch control terminal to which a k-th pixel control signal is input, and a switch output terminal which is electrically connected to the switch input terminal, wherein n is a natural number of 2 or more, and k is a natural number of 1 to n.

7 Claims, 9 Drawing Sheets

(51) Int. Cl.
    *H04N 5/378*         (2011.01)
    *H04N 5/369*         (2011.01)
    *H04N 5/3745*       (2011.01)
    *H04N 5/376*         (2011.01)

(52) U.S. Cl.
    CPC ....... *H04N 5/3765* (2013.01); *H04N 5/37457* (2013.01); *H04N 5/3692* (2013.01)

(58) Field of Classification Search
    USPC ........................................................ 348/300
    See application file for complete search history.

IMAGE SENSOR HAVING REDUCED POWER CONSUMPTION

This application is a continuation application based on a PCT International Application No. PCT/JP2015/050118, filed on Jan. 6, 2015, whose priority is claimed on Japanese Patent Application No. 2014-103571, filed on May 19, 2014. The contents of both the PCT International Application and the Japanese Patent Application are incorporated herein by reference.

BACKGROUND OF THE INVENTION

Field of the Invention

The present invention relates to an image sensor.

Description of Related Art

A scanning circuit of a CMOS image sensor is generally designed to perform a synchronous operation. In other words, the scanning circuit of a CMOS image sensor selectively reads information regarding a necessary pixel by synchronously operating a plurality of latches (shift registers). In an image sensor having a pixel matrix of (n+1) rows and (n+1) columns shown in FIG. 8 of Japanese Unexamined Patent Application, First Publication No. 2008-306695, each of a column scanning circuit for selecting a column of pixels and a data output circuit for selecting a row of pixels has latches.

In order for the data output circuit for selecting a row of pixels with high accuracy to exactly capture data, a master clock supplied from a clock supply circuit is supplied to the latches in order from the farthest latch. The data output circuit captures data output from a sense amplification circuit in accordance with a capture clock whose phase is adjusted on the basis of the master clock.

At least (n+1) buffers are required to adjust the phase of the above-described clock. The clock supplied to the buffers changes whenever a pixel for reading a signal changes. Therefore, a buffer corresponding to a pixel on which reading is not performed is also operated at each timing at which the clock changes, and power consumption occurs.

SUMMARY OF THE INVENTION

According to a first aspect of the present invention, an image sensor includes n light receiving elements including a first light receiving element to an n-th light receiving element, each of the light receiving elements generating a photoelectric conversion signal corresponding to an amount of light which is incident to a light reception surface; n sequencers including a first sequencer to an n-th sequencer, each of the sequencer having both a sequencer input terminal to which a k-th horizontal control signal is input, and a sequencer output terminal from which a (k+1)-th horizontal control signal is output after the k-th horizontal control signal is input to the sequencer input terminal; and n switches including a first switch to an n-th switch, each of the switches having a switch input terminal to which a signal corresponding to the photoelectric conversion signal generated by the k-th light receiving element is input, a switch control terminal to which a k-th pixel control signal based on the k-th horizontal control signal is input, and a switch output terminal which is electrically connected to the switch input terminal in accordance with the k-th pixel control signal which is input to the switch control terminal, wherein n is a natural number of 2 or more, and k is a natural number of 1 to n.

According to a second aspect of the present invention, in the image sensor according to the first aspect, each of the first sequencer to the n-th sequencer may further have a pixel control signal output terminal which outputs the k-th pixel control signal after the k-th horizontal control signal is input to the sequencer input terminal.

According to a third aspect of the present invention, the image sensor according to the first aspect may further include n amplifiers including a first amplifier to an n-th amplifier, each of the amplifiers having an amplifier input terminal to which the photoelectric conversion signal generated by the k-th light receiving element is input, and an amplifier output terminal from which an amplified signal obtained by amplifying the photoelectric conversion signal is output after a predetermined processing time elapses from inputting of the photoelectric conversion signal to the amplifier input terminal. The amplifier output terminal of the k-th amplifier may be connected to the switch input terminal of the k-th switch. The k-th sequencer may output the (k+1)-th horizontal control signal from the sequencer output terminal of the k-th sequencer after a predetermined delay time elapses from inputting of the k-th horizontal control signal to the sequencer input terminal of the k-th sequencer, and the predetermined delay time may be equal to or larger than the predetermined processing time.

According to a fourth aspect of the present invention, in the image sensor according to the third aspect, a ratio of load capacitance to an inverse number of an average value of output current capability of a device constituting the k-th sequencer may be equal to or higher than, by a predetermined value, a ratio of load capacitance to an inverse number of output current capability of a device constituting the k-th amplifier.

According to a fifth aspect of the present invention, the image sensor according to the second aspect may further include n amplifiers including a first amplifier to an n-th amplifier, each of the amplifiers having an amplifier input terminal to which the photoelectric conversion signal generated by the k-th light receiving element is input, and an amplifier output terminal from which an amplified signal obtained by amplifying the photoelectric conversion signal is output after a predetermined processing time elapses from inputting of the photoelectric conversion signal to the amplifier input terminal. The amplifier output terminal of the k-th amplifier may be connected to the switch input terminal of the k-th switch. The k-th sequencer may output the (k+1)-th horizontal control signal from the sequencer output terminal of the k-th sequencer after a predetermined delay time elapses from inputting of the k-th horizontal control signal to the sequencer input terminal of the k-th sequencer, and the predetermined delay time may be equal to or larger than the predetermined processing time.

According to a sixth aspect of the present invention, in the image sensor according to the fifth aspect, a ratio of load capacitance to an inverse number of an average value of output current capability of a device constituting the k-th sequencer may be equal to or higher than, by a predetermined value, a ratio of load capacitance to an inverse number of output current capability of a device constituting the k-th amplifier.

According to a seventh aspect of the present invention, the image sensor according to the second aspect may further include n amplifiers including a first amplifier to an n-th amplifier, each of the amplifiers has an amplifier input terminal to which the photoelectric conversion signal generated by the k-th light receiving element is input, an amplifier output terminal from which an amplified signal obtained by amplifying the photoelectric conversion signal which is input to the amplifier input terminal is output, and an amplifier completion terminal from which a k-th operation completion signal is output at a timing corresponding to a timing at which the amplified signal is output. Each of the first sequencer to the n-th sequencer may further have an operation completion signal input terminal to which the k-th operation completion signal output from the k-th amplifier is input. The amplifier output terminal of the k-th amplifier may be connected to the switch input terminal of the k-th switch. The (k+1)-th sequencer may output a (k+1)-th pixel control signal from the pixel control signal output terminal of the (k+1)-th sequencer and output a (k+2)-th horizontal control signal from the sequencer output terminal of the (k+1)-th sequencer based on a timing at which the k-th operation completion signal output from the k-th amplifier is input, and may stop outputting of the (k+2)-th horizontal control signal from the sequencer output terminal of the (k+1)-th sequencer based on a timing at which the (k+1)-th operation completion signal output from the (k+1)-th amplifier is input.

According to an eighth aspect of the invention, the image sensor according to the seventh aspect may further include a selector that has a selector input terminal connected to the amplifier completion terminals of the first to n-th amplifiers, and a selector output terminal outputting a data acquisition signal if the operation completion signal output from any one of the first to n-th amplifiers is input to the selector input terminal; and an AD converter that has an AD input terminal connected to the switch output terminals of the first to n-th switches, an AD control terminal connected to the selector output terminal, and an AD output terminal outputting a signal obtained by performing AD conversion on a signal which is input to the AD input terminal when the data acquisition signal is input to the AD control terminal.

According to a ninth aspect of the present invention, in the image sensor according to the eighth aspect, the AD converter may sample a signal which is input to the AD input terminal so as to convert the signal into a digital signal from an analog signal, and output the digital signal from the AD output terminal, only when the data acquisition signal is valid.

DETAILED DESCRIPTION OF THE INVENTION

Figure 1:
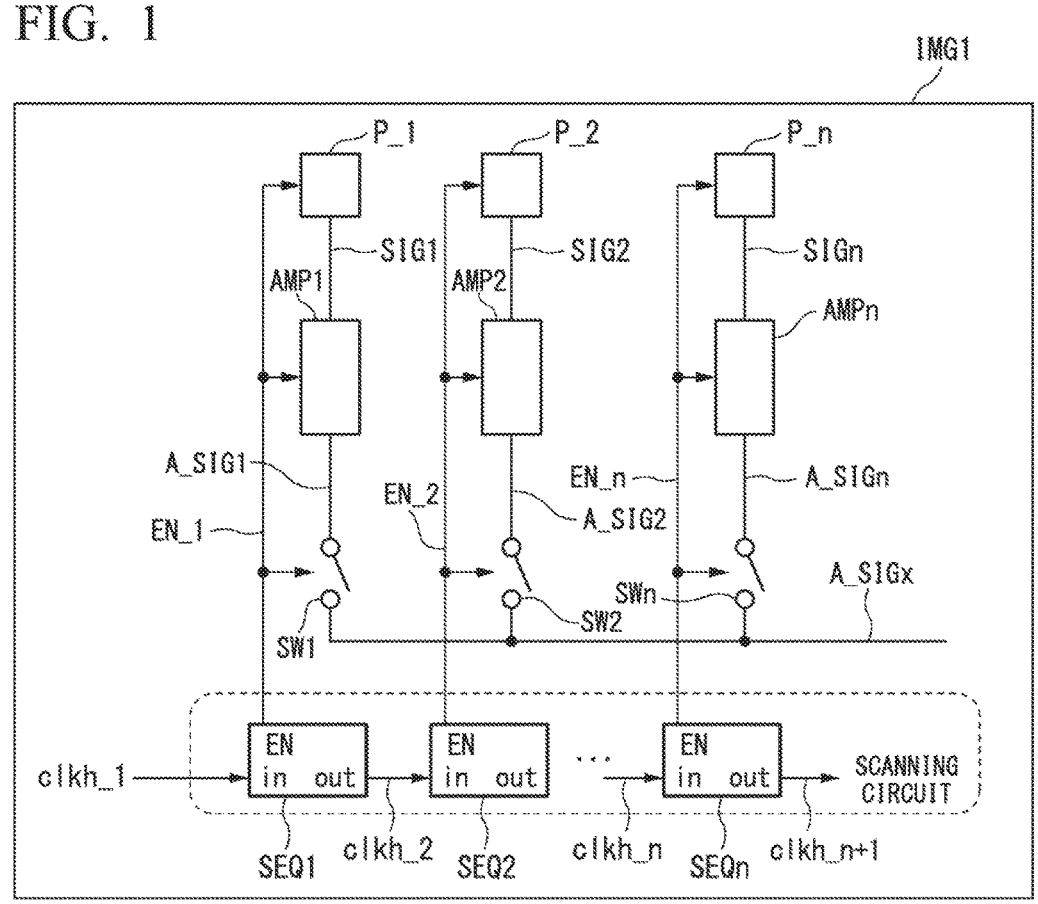
FIG. 1 is a block diagram showing a configuration of an image sensor according to a first embodiment of the present invention.

Hereinafter, with reference to the drawings, embodiments of the present invention will be described.
(First Embodiment)
First, a first embodiment of the present invention will be described.
(Entire Configuration of Image Sensor)
With reference to FIG. 1, a description will be made of a configuration of an image sensor IMG1 according to the present embodiment. FIG. 1 shows a configuration of the image sensor IMG1. As shown in FIG. 1, the image sensor IMG1 includes n light receiving elements such as first to n-th light receiving elements P_1 to P_n, n amplifiers such as first to n-th amplifiers AMP1 to AMPn, n switches such as first to n-th switches SW1 to SWn, and n sequencers such as first to n-th sequencers SEQ1 to SEQn. In FIG. 1, for convenience, n is a natural number of 3 or more, but n may be a natural number of 2 or more. In addition, k mentioned below is a natural number of 1 to n.

The first to n-th light receiving elements P_1 to P_n respectively generate photoelectric conversion signals SIG1 to SIGn corresponding to amounts of light which is incident to light reception surfaces. An operation of the k-th light receiving element P_k is controlled by a k-th pixel control signal EN_k.

The first to n-th amplifiers AMP1 to AMPn are respectively connected to the first to n-th light receiving elements P_1 to P_n. The k-th amplifier AMPk has an amplifier input terminal and an amplifier output terminal. The photoelectric conversion signal SIGk generated by the k-th light receiving element P_k is input to the amplifier input terminal. After a predetermined processing time elapses from inputting of the photoelectric conversion signal SIGk to the amplifier input terminal, an amplified signal A_SIGk obtained by amplifying the photoelectric conversion signal SIGk is output from the amplifier output terminal. An operation of the k-th amplifier AMPk is controlled by the k-th pixel control signal EN_k.

The first to n-th switches SW1 to SWn are respectively connected to amplifier output terminals of the first to n-th amplifiers AMP1 to AMPn. The k-th switch SWk has a switch input terminal, a switch control terminal, and a switch output terminal. The amplified signal A_SIGk corresponding to the photoelectric conversion signal SIGk generated by the k-th light receiving element P_k is input to the switch input terminal. The k-th pixel control signal EN_k based on a k-th horizontal control signal clkh_k is input to the switch control terminal. The switch output terminal is electrically connected to the switch input terminal according to the k-th pixel control signal EN_k which is input to the switch control terminal. The amplifier output terminal of the k-th amplifier AMPk is connected to the switch input terminal of the k-th switch SWk. An operation of the k-th switch SWk is controlled by the k-th pixel control signal EN_k. When the k-th switch SWk is turned on, the switch input terminal and the switch output terminal of the k-th switch SWk are electrically connected to each other. When the k-th switch SWk is turned off, a high impedance state occurs between the switch input terminal and the switch output terminal of the k-th switch SWk.

The first to n-th sequencers SEQ1 to SEQn form a scanning circuit. The first to n-th sequencers SEQ1 to SEQn are connected in series to each other. The k-th sequencer SEQk has a sequencer input terminal in, a sequencer output terminal out, and a pixel control signal output terminal EN. The k-th horizontal control signal clkh_k is input to the sequencer input terminal in. After the k-th horizontal control signal clkh_k is input to the sequencer input terminal in, a (k+1)-th horizontal control signal clkh_k+1 is output from the sequencer output terminal out. After the k-th horizontal control signal clkh_k is input to the sequencer input terminal in, the k-th pixel control signal EN_k is output from the pixel control signal output terminal EN. After a predetermined delay time elapses from inputting of the k-th horizontal control signal clkh_k to the sequencer input terminal in, the k-th sequencer SEQk outputs the (k+1)-th horizontal control signal clkh_k+1 from the sequencer output terminal out. The predetermined delay time is equal to or larger than a predetermined processing time for which the k-th amplifier AMPk performs an amplification process.

(Configuration and Operation of Sequencer)

Figure 3:
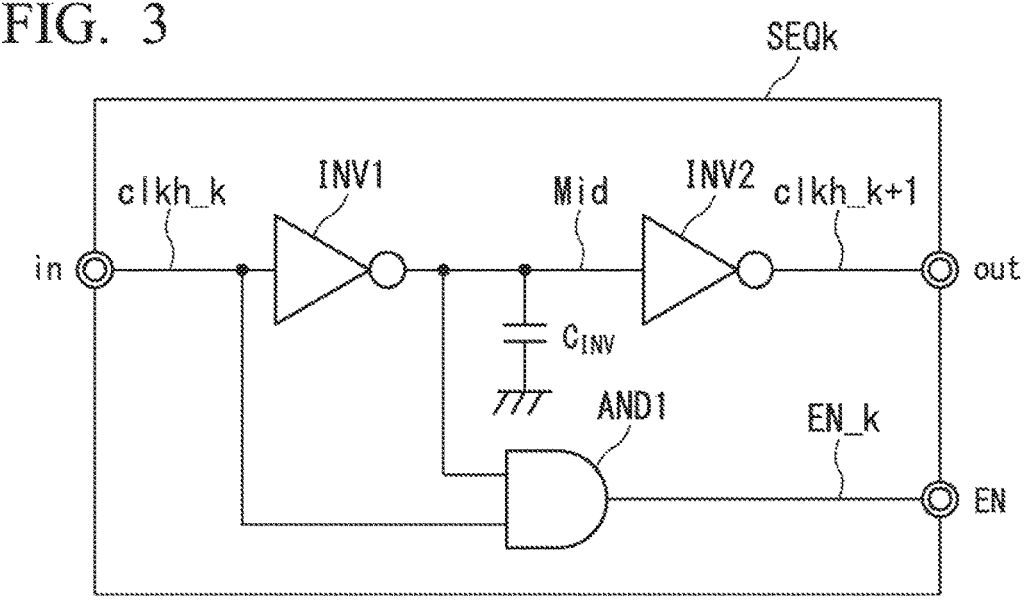
FIG. 3 is a circuit diagram showing a configuration of a sequencer provided in the image sensor according to the first embodiment of the present invention.

With reference to FIG. 3, a description will be made of a configuration of the k-th sequencer SEQk forming the image sensor IMG1. FIG. 3 shows a configuration of the k-th sequencer SEQk. The k-th sequencer SEQk includes a first inverter INV1, a second inverter INV2, an AND gate AND1, and a load capacitor $C_{INV}$.

An input terminal of the first inverter INV1 is connected to the sequencer input terminal in to which the k-th horizontal control signal clkh_k is input. An input terminal of the second inverter INV2 is connected to an output terminal of the first inverter INV1. An output terminal of the second inverter INV2 is connected to the sequencer output terminal out from which the (k+1)-th horizontal control signal clkh_k+1 is output. A first input terminal of the AND gate AND1 is connected to the sequencer input terminal in. A second input terminal of the AND gate AND1 is connected to the output terminal of the first inverter INV1. An output terminal of the AND gate AND1 is connected to the pixel control signal output terminal EN from which the k-th pixel control signal EN_k is output. A first terminal of the load capacitor $C_{INV}$ is connected to the output terminal of the first inverter INV1. A second terminal of the load capacitor $C_{INV}$ is connected to the ground.

Each of the first inverter INV1 and the second inverter INV2 inverts a signal which is input to the input terminal thereof, and outputs the inverted signal from the output terminal thereof. The AND gate AND1 outputs, from the output terminal, a signal indicating a result of an AND operation between the k-th horizontal control signal clkh_k which is input to the first input terminal and a signal Mid which is input to the second input terminal and is output from the first inverter INV1.

Figure 4:
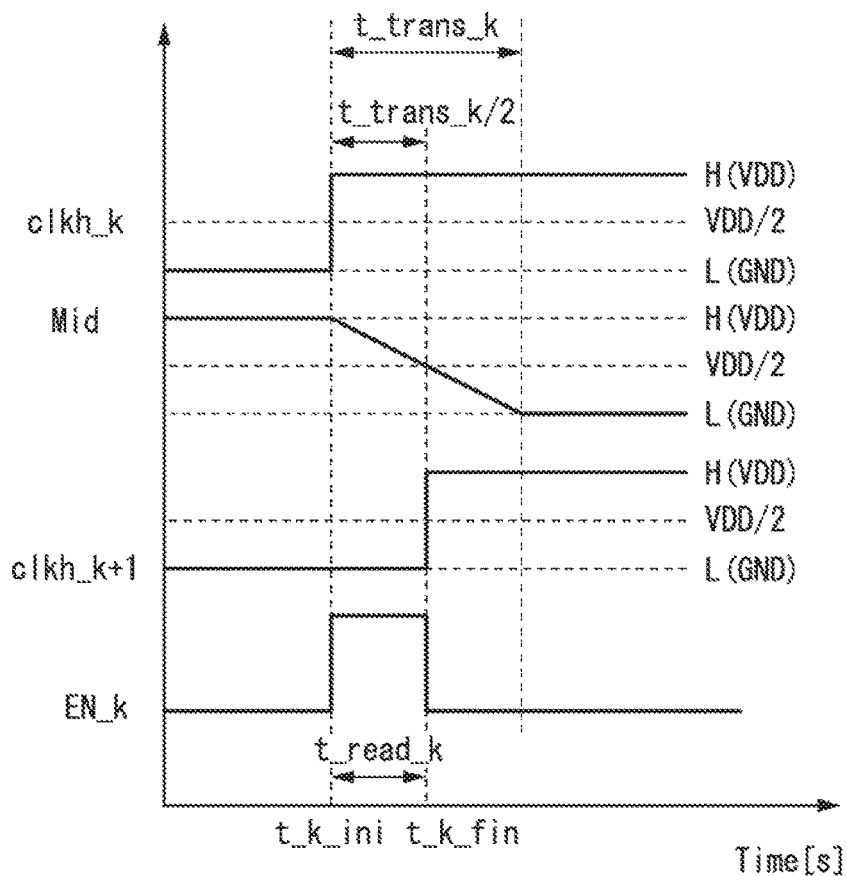
FIG. 4 is a timing chart showing an operation of the sequencer provided in the image sensor according to the first embodiment of the present invention.

Hereinafter, with reference to FIG. 4, a description will be made of an operation of the k-th sequencer SEQk. FIG. 4 shows a change in a voltage of each signal in the k-th sequencer SEQk. A transverse axis in FIG. 4 expresses time, and a longitudinal axis in FIG. 4 expresses a voltage. FIG. 4 shows a voltage of the k-th horizontal control signal clkh_k, a voltage of the signal Mid output from the output terminal of the first inverter INV1, a voltage of the (k+1)-th horizontal control signal clkh_k+1, and a voltage of the k-th pixel control signal EN_k in this order from the top.

Each signal line in the k-th sequencer SEQk is initialized by a reset mechanism (not shown) right after power is supplied. Due to the initialization, the respective voltages in the k-th sequencer SEQk are set so that the voltage of the k-th horizontal control signal clkh_k is set to "L", the voltage of the signal Mid is set to "H", the voltage of the (k+1)-th horizontal control signal clkh_k+1 is set to "L", and the voltage of the k-th pixel control signal EN_k is set to "L". "H" indicates a high level (VDD: power supply voltage), and "L" indicates a low level (GND: ground level).

If a level of the k-th horizontal control signal clkh_k which is input from the previous sequencer SEQk-1 changes from "L" to "H", the voltage of the signal Mid which is output from the first inverter INV1 transitions from "H" to "L" for time t_trans_k. Equation (1) indicates the time t_trans_k. Here, in Equation (1), $I_{OUT\_INV}$ indicates an average value of output current capability of the first inverter INV1, and $C_{INV}$ indicates a capacitance value of the load capacitor $C_{INV}$.

[Equation 1]

$$t\_trans\_k(C_{INV}/I_{OUT\_INV}) \cdot VDD \quad (1)$$

A threshold voltage of the AND gate AND1 is VDD/2. Thus, the k-th pixel control signal EN_k changes to "H" at a time point t_k_ini, is maintained in "H" in a period of t_trans_k/2=t_read_k, and returns to "L" again at a time point t_k_fin.

(Configuration and Operation of Amplifier)

Figure 5:
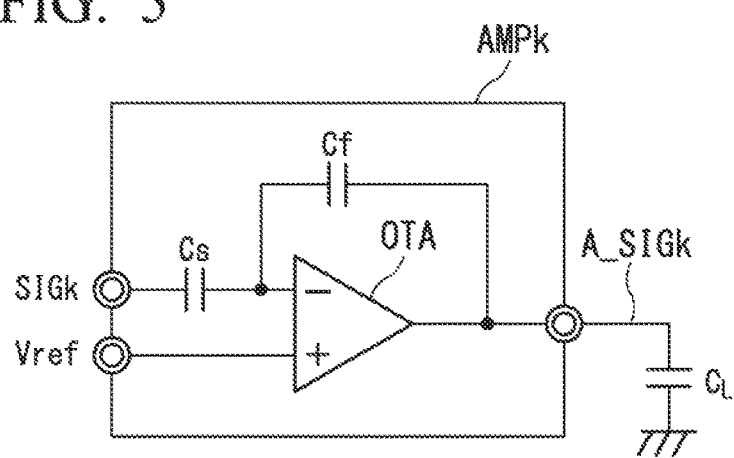
FIG. 5 is a circuit diagram showing a configuration of an amplifier provided in the image sensor according to the first embodiment of the present invention.

With reference to FIG. 5, a description will be made of a configuration of the k-th amplifier AMPk forming the image sensor IMG1. FIG. 5 shows a configuration of the k-th amplifier AMPk. The k-th amplifier AMPk includes an input capacitor Cs, a feedback capacitor Cf, and a transconductance amplifier OTA. A load capacitor $C_L$ in FIG. 5 indicates a sum total of input capacitances or parasitic capacitances of a circuit (for example, an AD converter) connected to a subsequent stage of the k-th amplifier AMPk.

A first terminal of the input capacitor Cs is connected to the amplifier input terminal to which the photoelectric conversion signal SIGk is input. A negative input terminal of the transconductance amplifier OTA is connected to a second terminal of the input capacitor Cs. A positive input terminal of the transconductance amplifier OTA is connected to a reference voltage input terminal to which a reference voltage Vref is input. An output terminal of the transconductance amplifier OTA is connected to the amplifier output terminal from which the amplified signal A_SIGk is output. A first terminal of the feedback capacitor Cf is connected to the second terminal of the input capacitor Cs and the negative input terminal of the transconductance amplifier OTA. A second terminal of the feedback capacitor Cf is connected to the output terminal of the transconductance amplifier OTA and the amplifier output terminal.

The amplified signal A_SIGk output from the k-th amplifier AMPk having the above-described configuration is stabilized at a time constant $\tau_{AMP}$ expressed by Equation (2). In Equation (2), $C_s$ indicates a capacitance value of the input capacitor Cs, $C_f$ indicates a capacitance value of the feedback capacitor Cf $C_L$ indicates a capacitance value of the load capacitor $C_L$, and $G_m$ indicates a transconductance of the transconductance amplifier OTA.

[Equation 2]
$$\tau_{AMP} = \frac{C_L C_s + C_L C_f + C_s C_f}{G_m C_f} \quad (2)$$

Therefore, if Equation (3) is satisfied, the time t_trans_k/2 for which the pixel control signal output terminal EN_k is in "H" is sufficient time required for the amplified signal A_SIGk output from the k-th amplifier AMPk to be stabilized.

[Equation 3]
$$t\_trans\_k/2 \geq \tau_{AMP} \quad (3)$$

In Equation (2), if $G_m$ is expressed by $G_m=\alpha I_d$ ($\alpha$: constant of about 1 to 40, and $I_d$: current flowing through the transconductance amplifier OTA which is an input differential pair of the amplifier), Equation (3) may be modified into Equation (4).

[Equation 4]
$$(1/I_{OUT\_INV}) \cdot C_{INV} \cdot VDD \geq (1/I_d)\frac{C_L C_s + C_L C_f + C_s C_f}{\alpha C_f} \quad (4)$$

As can be seen from Equation (4), a ratio of the load capacitance to an inverse number of an average value of the output current capability IOUT_INV of the device forming the k-th sequencer SEQk, that is, the first inverter INV1 is equal to or higher than, by a predetermined value, a ratio of the load capacitance to an inverse number of the output current capability Id of the device forming the k-th amplifier AMPk, that is, the transconductance amplifier OTA. Consequently, an amplified signal output from the k-th amplifier AMPk is stabilized within the time t_trans_k/2 for which the pixel control signal output terminal EN_k is in "H". In other words, the (k+1)-th amplifier AMPk+1 can start an amplification operation after the amplified signal A_SIGk output from the k-th amplifier AMPk is stabilized.

(Operation of Entire Image Sensor)

Figure 2:
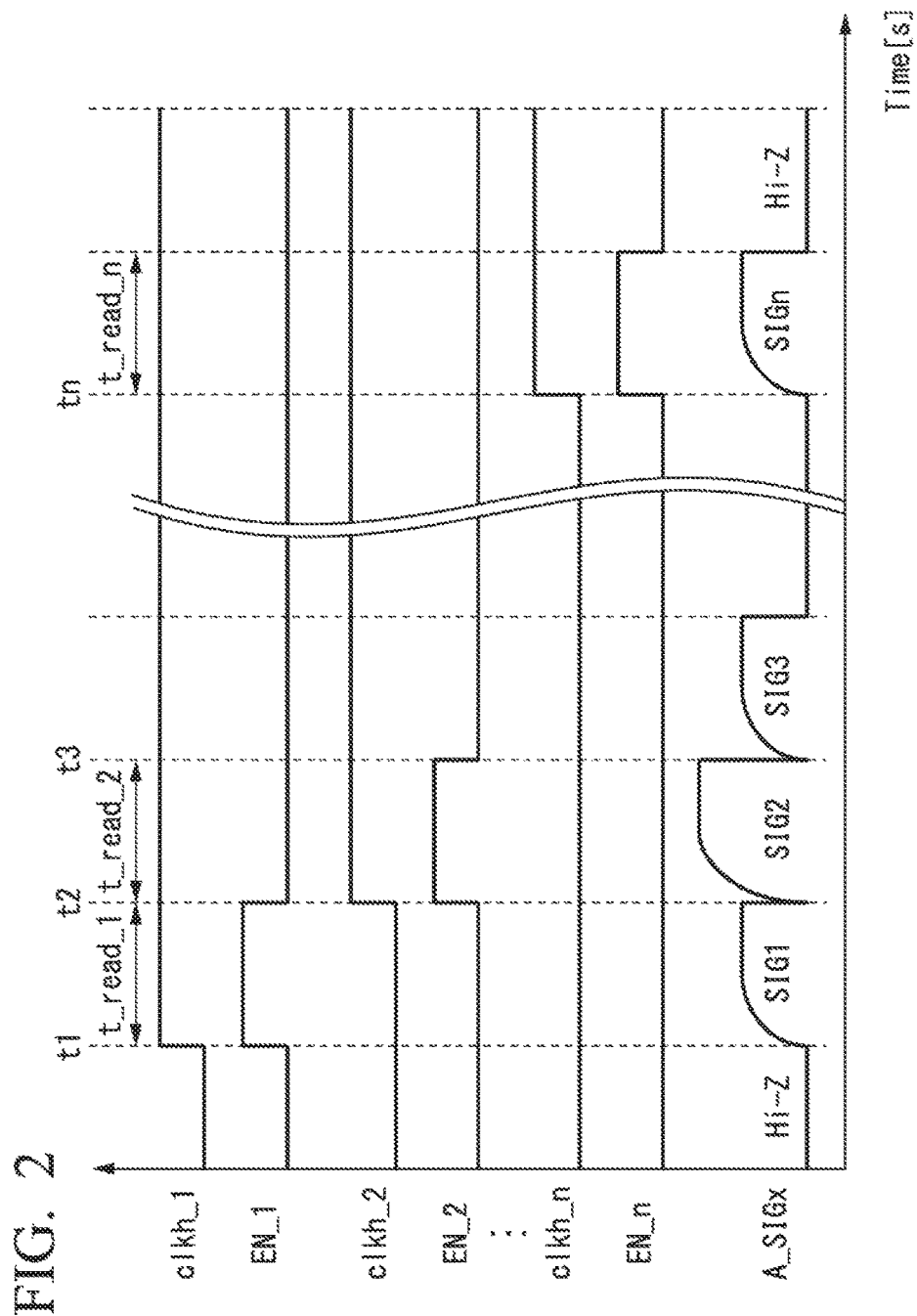
FIG. 2 is a timing chart showing an operation of the image sensor according to the first embodiment of the present invention.

With reference to FIG. 2, a description will be made of an operation of the entire image sensor IMG1. FIG. 2 shows changes in voltages of principal signals in the image sensor IMG1. A transverse axis in FIG. 2 expresses time, and a longitudinal axis in FIG. 2 expresses a voltage. FIG. 2 shows a voltage of the first horizontal control signal clkh_1, a voltage of the first pixel control signal EN_1, a voltage of the second horizontal control signal clkh_2, a voltage of the second pixel control signal EN_2, . . . , a voltage of the n-th horizontal control signal clkh_n, a voltage of the n-th pixel control signal EN_n, and a voltage of an amplified signal A_SIGx which is output from any one of the first to n-th switches SW1 to SWn in this order from the top. An individual operation corresponding to each signal shown in FIG. 2 has already been described, and thus a description thereof will be omitted.

At a time point t1, if a level of the first horizontal control signal clkh_1 which is input to the sequencer input terminal in of the first sequencer SEQ1 is changed from "L" to "H", the first sequencer SEQ1 changes a level of the first pixel control signal EN_1 from "L" to "H". Due to the change of the level of the first pixel control signal EN_1, the first light receiving element P_1 outputs the photoelectric conversion signal SIG1, and the first amplifier AMP1 starts an amplification operation.

Simultaneously therewith, the first switch SW1 is turned on. The first sequencer SEQ1 changes a level of the first pixel control signal EN_1 to "L" at a time point t2 after a predetermined period t_read_1 elapses from the time point t1. If a level of the second horizontal control signal clkh_2 which is input to the sequencer input terminal in of the second sequencer SEQ2 is changed from "L" to "H", the second sequencer SEQ2 changes a level of the second pixel control signal EN_2 from "L" to "H". Due to the change of the level of the second pixel control signal EN_2, the second light receiving element P_2 outputs the photoelectric conversion signal SIG2, and the second amplifier AMP2 starts an amplification operation.

Simultaneously therewith, the second switch SW2 is turned on. This operation is sequentially repeatedly performed from the first sequencer SEQ1 to the n-th sequencer SEQn.

(Appendix)

In the present embodiment, the first to n-th amplifiers AMP1 to AMPn are not essential elements. It is not essential that the first to n-th light receiving elements P_1 to P_n and the first to n-th amplifiers AMP1 to AMPn are controlled by using the first to n-th pixel control signal output terminals EN_1 to EN_n.

(Operations and Effects)

According to the present embodiment, the image sensor IMG1 includes the n light receiving elements such as the first to n-th light receiving elements P_1 to P_n which respectively generate the photoelectric conversion signals SIG1 to SIGn corresponding to amounts of light which is incident to light reception surfaces; the n sequencers such as the first to n-th sequencers SEQ1 to SEQn each of which has the sequencer input terminal in to which the k-th horizontal control signal clkh_k is input, and the sequencer output terminal out from which the (k+1)-th horizontal control signal clkh_k+1 is output after the k-th horizontal control signal clkh_k is input to the sequencer input terminal in; and the n switches such as first to n-th switches SW1 to SWn each of which has the switch input terminal to which a signal corresponding to the photoelectric conversion signal SIGk generated by the k-th light receiving element P_k is input, the switch control terminal to which the k-th pixel control signal EN_k based on the k-th horizontal control signal clkh_k is input, and the switch output terminal which is electrically connected to the switch input terminal according to the k-th pixel control signal EN_k which is input to the switch control terminal. Here, n is a natural number of 2 or more, and k is a natural number of 1 to n.

In the present embodiment, the k-th sequencer SEQk performs a first operation of changing a level of the k-th pixel control signal EN_k from "L" to "H" when a level of the k-th horizontal control signal clkh_k which is input from the previous (k−1)-th sequencer SEQk−1 is changed from "L" to "H". The k-th sequencer SEQk performs a second operation of changing a level of the k-th pixel control signal EN_k from "H" to "L" after the predetermined period t_read_k elapses from changing of a level of the k-th pixel control signal EN_k to "H". The k-th sequencer SEQk performs a third operation of changing a level of (k+1)-th horizontal control signal clkh_k+1 which is output to the (k+1)-th sequencer SEQk+1, from "L" to "H". The k-th sequencer SEQk performs only the first to third operations, and thus power consumption does not occur in periods other than periods for the operations.

In other words, the k-th sequencer SEQk may be operated in only a period from input of the k-th horizontal control signal clkh_k to output of the (k+1)-th horizontal control signal clkh_k+1. A buffer which is normally operated in order to supply a clock to the k-th sequencer is not necessary. Thus, it is possible to reduce power consumption.

(Second Embodiment)

Next, a second embodiment of the present invention will be described.

(Configuration of Image Sensor)

Figure 6:
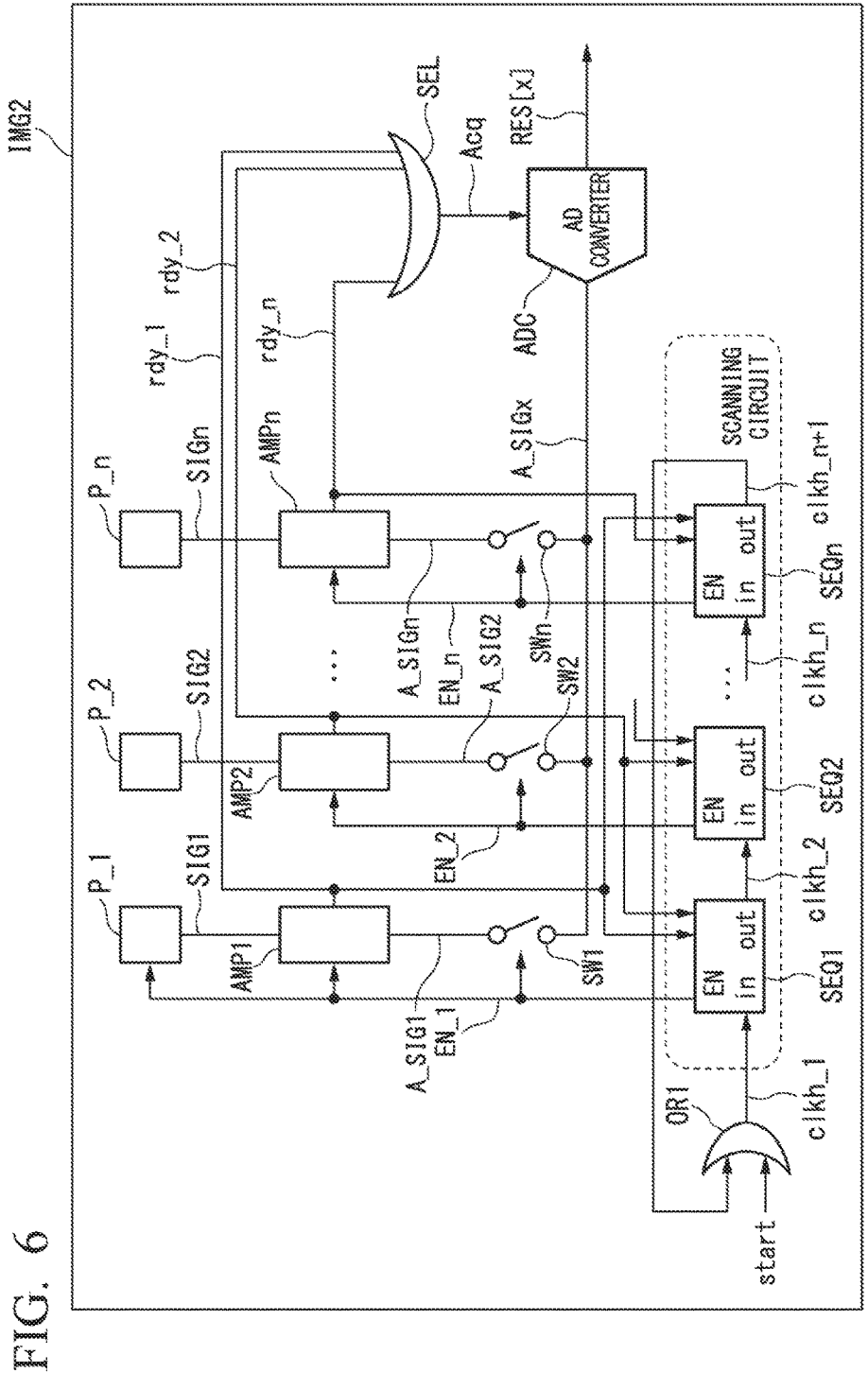
FIG. 6 is a block diagram showing a configuration of an image sensor according to a second embodiment of the present invention.

With reference to FIG. 6, a description will be made of a configuration of an image sensor IMG2 according to the present embodiment. FIG. 6 shows a configuration of the image sensor IMG2. As shown in FIG. 6, the image sensor IMG2 includes n light receiving elements such as first to n-th light receiving elements P_1 to P_n, n amplifiers such as first to n-th amplifiers AMP1 to AMPn, n switches such as first to n-th switches SW1 to SWn, n sequencers such as first to n-th sequencers SEQ1 to SEQn, a selector SEL, an AD converter ADC, and an OR gate OR1. In FIG. 6, for convenience, n is a natural number of 3 or more. In addition, n may be a natural number of 2 or more. Further, k mentioned below is a natural number of 1 to n.

Hereinafter, differences from the image sensor IMG1 according to the first embodiment will be described. The k-th amplifier AMPk has an amplifier input terminal, an amplifier output terminal, and an amplifier completion terminal from which a k-th operation completion signal rdy_k is output at a timing corresponding to a timing at which the amplified signal A_SIGk is output. The amplifier input terminal and the amplifier output terminal are the same as those in the first embodiment.

The k-th sequencer SEQk has a sequencer input terminal in, a pixel control signal output terminal EN, a sequencer output terminal out, a first operation completion signal input terminal to which the k-th operation completion signal rdy_k output from the k-th amplifier AMPk is input, and a second operation completion signal input terminal to which a (k+1)-th operation completion signal rdy_k+1 output from the (k+1)-th amplifier AMPk+1 is input. The sequencer input terminal in, the pixel control signal output terminal EN, and the sequencer output terminal out are the same as those in the first embodiment.

The (k+1)-th sequencer SEQk+1 performs the following operation in addition to the operation described in the first embodiment. In the (k+1)-th sequencer SEQk+1, the (k+1)-th pixel control signal EN_k+1 and the (k+2)-th horizontal control signal clkh_k+2 are respectively output from the pixel control signal output terminal EN and the sequencer output terminal out according to a timing at which the k-th operation completion signal rdy_k output from the k-th amplifier AMPk is input. The (k+1)-th sequencer SEQk+1 stops outputting of the (k+2)-th horizontal control signal clkh_k+2 from the sequencer output terminal out according to a timing at which the (k+1)-th operation completion signal rdy_k+1 output from the (k+1)-th amplifier AMPk+1 is input.

In other words, in the present embodiment, the (k+1)-th sequencer SEQk+1 starts an operation after the k-th amplifier ANMPk completes the amplification operation. The (k+1)-th sequencer SEQk+1 stops the operation after the (k+1)-th amplifier AMPk+1 completes the amplification operation. In the present embodiment, an operation does not break due to a variation in signal delay time caused by variations in characteristics of the circuit elements.

The selector SEL is connected to the amplifier completion terminals of the first to n-th amplifiers AMP1 to AMPn. The selector SEL has a selector input terminal and a selector output terminal. The selector input terminal amplifier completion terminals of the first to n-th amplifiers AMP1 to AMPn. A data acquisition signal Acq is output from the selector output terminal if an operation completion signal output from any one of the first to n-th amplifiers AMP1 to AMPn is input to the selector input terminal.

The selector SEL outputs the data acquisition signal Acq having a state of "L" when all of the first to n-th operation completion signals rdy_1 to rdy_n are in "L". The selector SEL changes a level of the data acquisition signal Acq to "H" if a level of any one of the first to n-th operation completion signals rdy_1 to rdy_n is changed from "L" to "H".

AD converter ADC is connected to the switch output terminals of the first to n-th switches SW1 to SWn and the selector output terminal of the selector SEL. The AD converter ADC has an AD input terminal, an AD control terminal, and an AD output terminal. The AD input terminal is connected to the switch output terminals of the first to n-th switches SW1 to SWn. The AD control terminal is connected to the selector output terminal of the selector SEL. The AD output terminal outputs a signal (AD conversion result RES[x]) obtained by performing AD conversion on a signal (amplified signal A_SIGx) which is input to the AD input terminal when the data acquisition signal Acq is input to the AD control terminal.

The AD converter ADC continuously samples (tracks) an amplified signal A_SIGx selected by the first to n-th switches SW1 to SWn in a state in which the data acquisition signal Acq is in "L". If the data acquisition signal Acq transitions from "L" to "H", the AD converter ADC holds a sampling voltage at the moment at which the transition occurs in the AD converter ADC. The AD converter ADC starts AD conversion from right after the holding operation is completed, and outputs an AD conversion result RES[k] after time t_conv elapses from a time point at which the data acquisition signal Acq transitions from "L" to "H". In order to perform accurate AD conversion, a sampling voltage is required to be held in the AD converter ADC while the AD conversion is being performed. Thus, the data acquisition signal Acq is required to be maintained in a state of "H" for at least the time t_conv and then to return to "L". In other words, if the data acquisition signal Acq transitions to "H", that is, a valid state, the AD converter ADC holds the amplified signal A_SIGx during sampling, and converts the amplified signal A_SIGx from an analog signal into a digital signal, that is, into an AD conversion result RES[k] so as to output the AD conversion result RES[k] from the AD output terminal.

The OR gate OR1 has a first input terminal to which a start signal start is input, a second input terminal to which a (n+1)-th horizontal control signal clkh_n+1 is input, and an output terminal from which the first horizontal control signal clkh_1 is output. The OR gate OR1 outputs a signal indicating a result of an OR operation between the start signal start which is input to the first input terminal and the (n+1)-th horizontal control signal clkh_n+1 which is input to the second input terminal, as the first horizontal control signal clkh_1. The OR gate OR1 is provided to repeatedly process the first to the photoelectric conversion signals SIG1 to SIGn output from the first to n-th light receiving elements P_1 to P_n.

(Operation of Entire Image Sensor)

Figure 7:
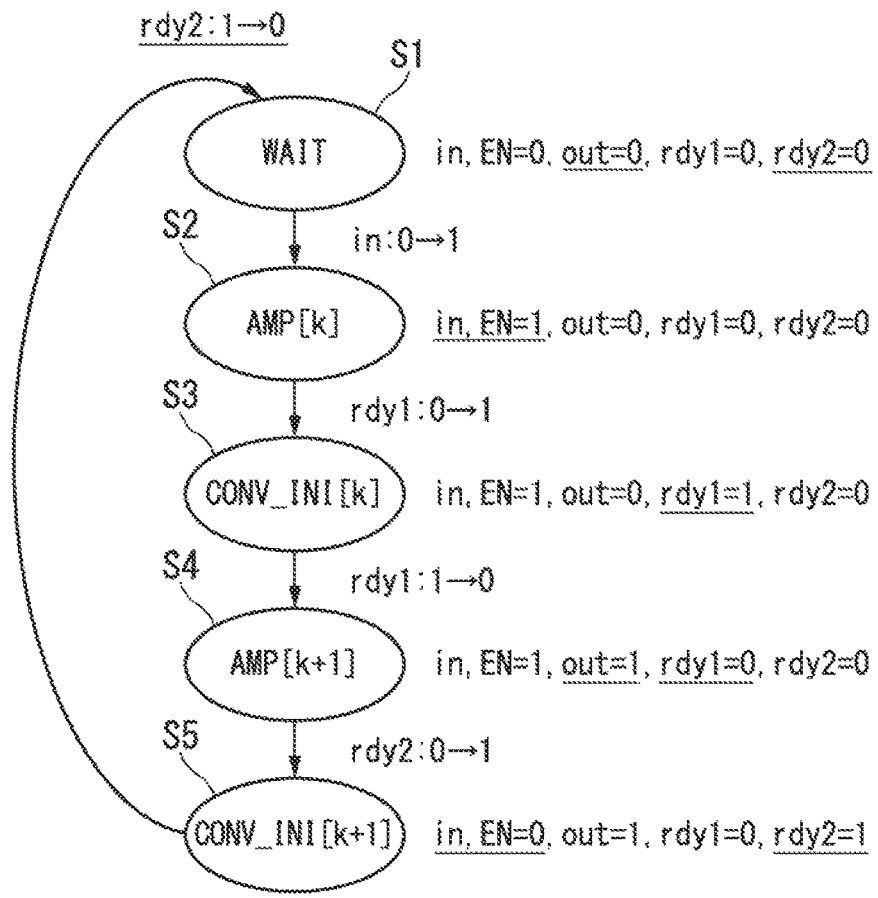
FIG. 7 is a reference diagram showing state transition of the image sensor according to the second embodiment of the present invention.
Figure 8:
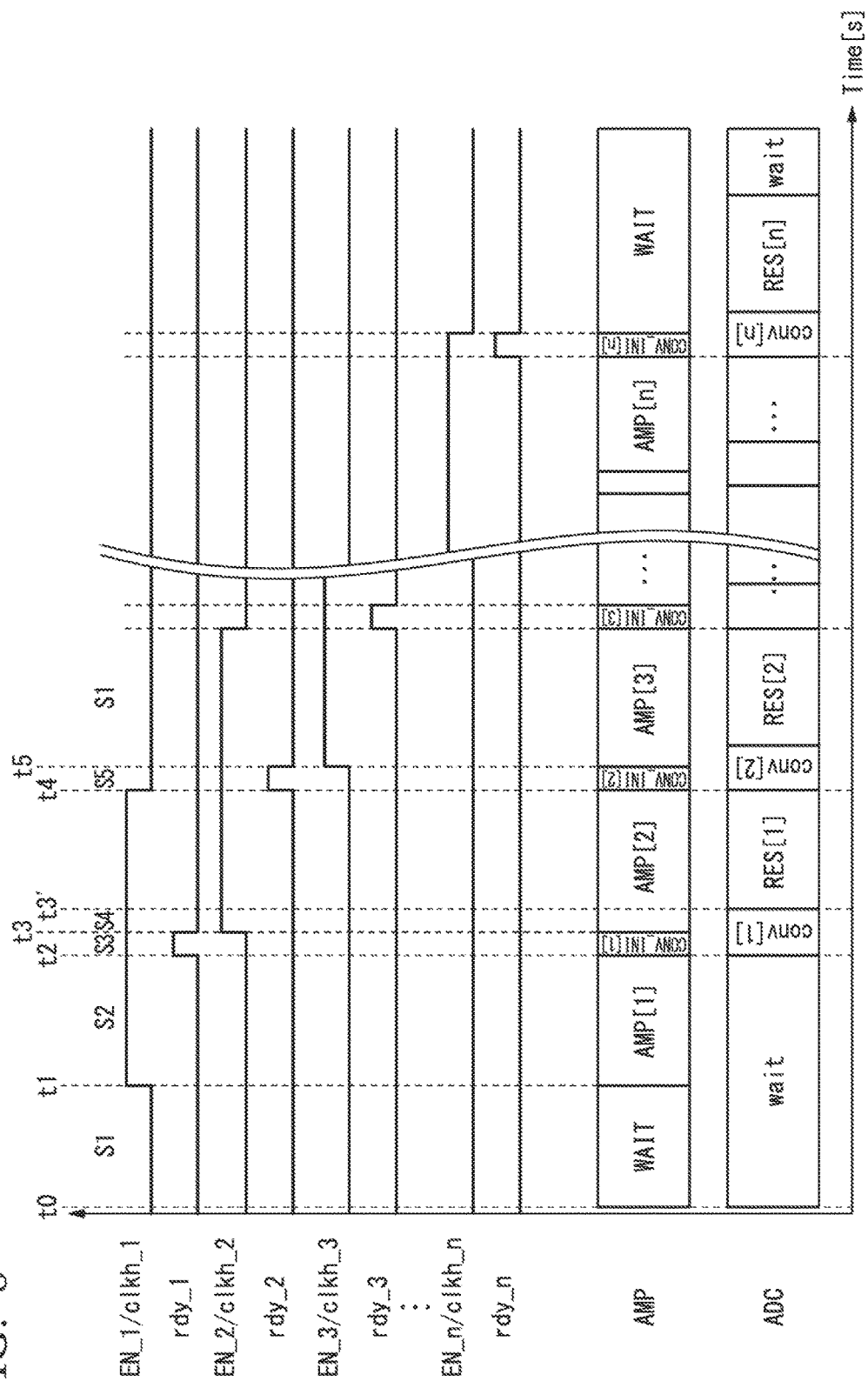
FIG. 8 is a timing chart showing an operation of the image sensor according to the second embodiment of the present invention.

With reference to FIGS. 7 and 8, a description will be made of an operation of the entire image sensor IMG2. FIG. 7 shows state transition of the image sensor IMG2. Five states such as a state S to a state S5 shown in FIG. 7 are repeated. Details of each state will be described with reference to FIG. 8.

FIG. 8 shows changes in voltages of principal signals in the image sensor IMG2. A transverse axis in FIG. 8 expresses time, and a longitudinal axis in FIG. 8 expresses a voltage. FIG. 8 shows voltages of the first pixel control signal EN_1 and the first horizontal control signal clkh_1, a voltage of the first operation completion signal rdy_1, voltages of the second pixel control signal EN_2 and the second horizontal control signal clkh_2, a voltage of the second operation completion signal rdy_2, voltages of the third pixel control signal EN_3 and the third horizontal control signal clkh_3, a voltage of the third operation completion signal rdy_3, . . . , voltages of the n-th pixel control signal EN_n and the n-th horizontal control signal clkh_n, and a voltage of the n-th operation completion signal rdy_n, in this order from the top. The (n+1)-th horizontal control signal clkh_n+1 is equivalent to the first horizontal control signal clkh_1, and thus is not shown in the figure. FIG. 8 shows states of the first to n-th amplifiers AMP1 to AMPn, and a state of the AD converter ADC.

At a time point t0 right after power is supplied, each signal line in the k-th sequencer SEQk is initialized by a reset mechanism (not shown). Due to the initialization, the respective voltages in the k-th sequencer SEQk are set so that the voltage of the k-th horizontal control signal clkh_k is set to "L", the voltage of the (k+1)-th horizontal control signal clkh_k+1 is set to "L", the voltage of the k-th pixel control signal EN_k is set to "L", the voltage of the k-th operation completion signal rdy_k is set to "L", and the voltage of the (k+1)-th operation completion signal rdy_k+1 is set to "L".

The first to n-th amplifiers AMP1 to AMPn are all in a pause state WAIT, and levels of the first to n-th operation completion signal rdy_1 to rdy_n output from the amplifier completion terminals of the first to n-th amplifiers AMP1 to AMPn are all changed to "L". AD conversion results RES[x] output from the AD converter ADC are all set to 0, and the AD converter ADC is in a pause state wait. At this time, a state of the first sequencer SEQ1 is the state S1 (WAIT) shown in FIG. 7.

At a time point t1, a level of the first horizontal control signal clkh_1 which is input to the first sequencer SEQ1 in the pause state WAIT is changed from "L" to "H". The first sequencer SEQ1 changes a level of the first pixel control signal EN_1 from "L" to "H" simultaneously with the level of the first horizontal control signal clkh_1 being changed from "L" to "H". Due to the change of the level of the first pixel control signal EN_1, the first amplifier AMP1 starts an amplification operation. The first light receiving element P_1 outputs the photoelectric conversion signal SIG1, and the first switch SW1 is turned on. At this time, a state of the first amplifier AMP1 is the state S2 (AMP[1]) shown in FIG. 7.

At a time point t2, a level of the first operation completion signal rdy_1 output from the amplifier completion terminal of the first amplifier AMP1 having completed the amplification operation is changed from "L" to "H". The first operation completion signal rdy_1 is input to the first operation completion signal input terminal of the first sequencer SEQ1, the selector input terminal of the selector SEL, and the second operation completion signal input terminal of the n-th sequencer SEQn. If the first operation completion signal rdy_1 in "H" is input to the selector input terminal, the selector SEL changes a level of the data acquisition signal Acq from "L" to "H". If a rising edge of the data acquisition signal Acq is detected, the AD converter ADC starts to perform digital conversion on an amplified signal A_SIG1 output from the first switch SW1. At this time, states of the first amplifier AMP1 and the AD converter ADC are the state S3 (CONV_INI[1], conv[1]) shown in FIG. 7.

At a time point t3 after a predetermined processing time elapses from the time point t2, the first amplifier AMP1 changes a level of the first operation completion signal rdy_1 from "H" to "L", and is brought into a pause state again. If the level of the first operation completion signal rdy_1 is changed from "H" to "L", the first sequencer SEQ1 changes a level of the second horizontal control signal clkh_2 from "L" to "H". The second sequencer SEQ2 changes a level of the second pixel control signal EN_2 from "L" to "H" simultaneously with the level of the second horizontal control signal clkh_2 being changed from "L" to "H". Due to the change of the level of the second pixel control signal EN_2, the second amplifier AMP2 starts an amplification operation. The second light receiving element P_2 outputs the photoelectric conversion signal SIG2, and the second switch SW2 is turned on. A state of the second amplifier AMP2 is the state S4 (AMP[2]) shown in FIG. 7.

The first operation completion signal rdy_1 is input to the selector input terminal of the selector SEL. If the level of the first operation completion signal rdy_1 which is input to the selector input terminal is changed from "H" to "L", the selector SEL changes a level of the data acquisition signal Acq from "H" to "L".

The AD converter ADC outputs an AD conversion result RES[1] at a time point t3' after a predetermined time elapses from the time point t2. If the AD conversion operation is completed, the AD converter ADC brings a core portion performing the AD conversion operation into a pause state in a state of holding the AD conversion result RES[1]. The time point t3 and the time point t3' are required to be earlier than a time point t4 which will be described later, but one of the time point t3 and the time point t3' may be earlier than the other.

At the time point t4, a level of the second operation completion signal rdy_2 output from the amplifier completion terminal of the second amplifier AMP2 having completed the amplification operation is changed from "L" to "H". The second operation completion signal rdy_2 is input to the first operation completion signal input terminal of the second sequencer SEQ2, and the second operation completion signal input terminal of the first sequencer SEQ1. If it is detected that the level of second operation completion signal rdy_2 has been changed from "L" to "H", the first sequencer SEQ1 changes levels of both of the first horizontal control signal clkh_1 and the first pixel control signal EN_1 from "H" to "L". The second operation completion signal rdy_2 is input to the selector input terminal of the selector SEL. If the second operation completion signal rdy_2 in "H" is input to the selector input terminal, the selector SEL changes a level of the data acquisition signal Acq from "L" to "H". If a rising edge of the data acquisition signal Acq is detected, the AD converter ADC starts to perform digital conversion on an amplified signal A_SIG2 output from the second switch SW2. At this time, states of the first amplifier AMP1 and the AD converter ADC are the state S5 (CONV_INI[2], conv[2]) shown in FIG. 7.

At a time point t5 after a predetermined time elapses from the time point t4, the second amplifier AMP2 changes a level of the second operation completion signal rdy_2 from "H" to "L", and is brought into a pause state again. If the level of the second operation completion signal rdy_2 is changed from "H" to "L", the second sequencer SEQ2 changes a level of the third horizontal control signal clkh_3 from "L" to "H". The third sequencer SEQ3 changes a level of the third pixel control signal EN_3 from "L" to "H" simultaneously with the level of the third horizontal control signal clkh_3 being changed from "L" to "H". Due to the change of the level of the third pixel control signal EN_3, the third amplifier AMP3 starts an amplification operation. The third light receiving element P_3 outputs the photoelectric conversion signal SIG3, and the third switch SW3 is turned on.

The second operation completion signal rdy_2 is input to the selector input terminal of the selector SEL. If the level of the second operation completion signal rdy_2 which is input to the selector input terminal is changed from "H" to "L", the selector SEL changes a level of the data acquisition signal Acq from "H" to "L".

The second operation completion signal rdy_2 is input to the second operation completion signal input terminal of the first sequencer SEQ1. If the level of the second operation completion signal rdy_2 returns from "H" to "L", all voltages of the input terminal and the output terminal of the first sequencer SEQ1 have "L". At this time, a state of the first sequencer SEQ1 returns to the state S1 (WAIT) shown in FIG. 7. After time point t5, no clock is input to and output from the first sequencer SEQ1, and thus power consumption does not occur in the first sequencer SEQ1.

As described above, the first to n-th sequencers SEQ1 to SEQn and the first to n-th amplifiers AMP1 to AMPn sequentially start operations from the left part of FIG. 6 to the right part. The first to n-th sequencers SEQ1 to SEQn and the first to n-th amplifiers AMP1 to AMPn are brought into a pause state if an amplification operation on each column is completed. In other words, the k-th sequencer SEQk transitions to the pause state WAIT in which no clock is input, and the k-th amplifier AMPk also transitions to the pause state.

(Operations and Effects)

In the present embodiment, power consumption in the pause state WAIT of the first to n-th sequencers SEQ1 to SEQn is 0. Since a buffer for normally supplying a clock to a sequencer which is not operated is not necessary, it is possible to reduce power consumption. Since the (k+1)-th sequencer SEQk+1 starts an operation after the k-th amplifier AMPk completes an amplification operation, and the (k+1)-th sequencer SEQk+1 stops the operation after the (k+1)-th amplifier AMPk+1 completes an amplification operation, it is possible to reduce breaking of an operation due to a variation in signal delay time.

The AD converter ADC starts AD conversion from right after the level of the data acquisition signal Acq is changed from "L" to "H", and transitions to a pause state in a state of holding a result of the AD conversion if the AD conversion is completed. Therefore, it is possible to further reduce power consumption.

(First Modification Example)

Figure 9:
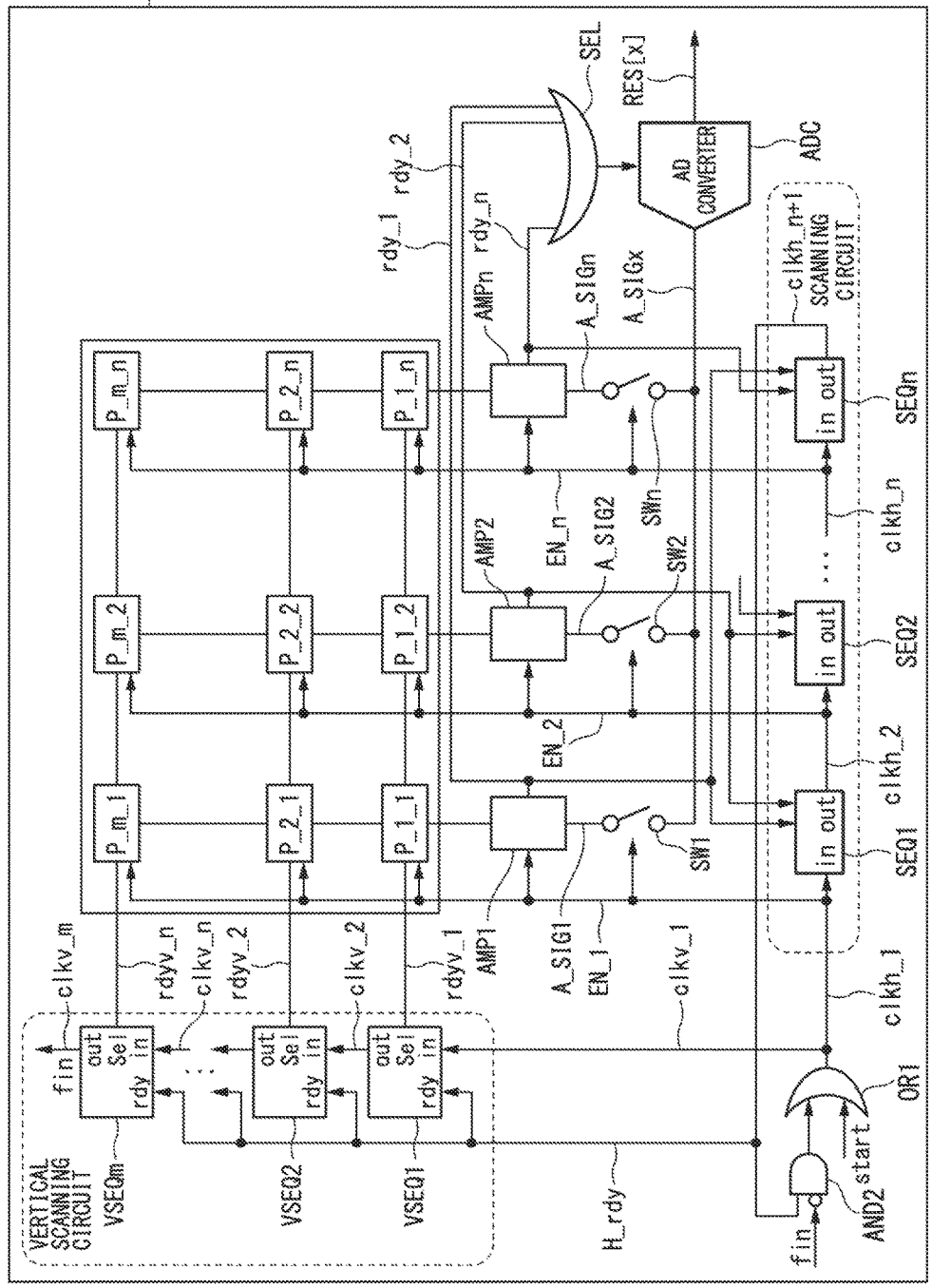
FIG. 9 is a block diagram showing a configuration of an image sensor according to a first modification example of the embodiment of the present invention.

Next, with reference to FIG. 9, a description will be made of a first modification example of the embodiment of the present invention. FIG. 9 shows a configuration of an image sensor IMG3 according to the present modification example. The image sensor IMG3 is a two-dimensional sensor. As shown in FIG. 9, the image sensor IMG3 includes m×n light receiving elements P_1_1 to P_m_n, n amplifiers such as first to n-th amplifiers AMP1 to AMPn, n switches such as first to n-th switches SW1 to SWn, n sequencers such as first to n-th sequencers SEQ1 to SEQn, m sequencers such as first to m-th sequencers VSEQ1 to VSEQm, a selector SEL, an AD converter ADC, an OR gate OR1, and an AND gate AND2. In FIG. 9, for convenience, m and n are natural numbers of 3 or more. In addition, m and n may be natural numbers of 2 or more. Further, k mentioned below is a natural number of 1 to n. Still further, j mentioned below is a natural number of 1 or more and m or less.

Hereinafter, differences from the image sensor IMG2 shown in FIG. 6 will be described. The light receiving elements P_1_1 to P_m_n are arranged in a matrix. The k-th pixel control signal EN_k and a j-th row selection signal rdy_j from the j-th sequencer VSEQj are input to the j-th row light receiving elements P_j_1 to P_j_n.

The first to n-th sequencers SEQ1 to SEQn do not have the pixel control signal output terminals EN. The k-th horizontal control signal clkh_k and the k-th pixel control signal EN_k in FIG. 7 are changed similarly to each other, and thus the k-th horizontal control signal clkh_k also functions as the k-th pixel control signal EN_k in FIG. 9.

The first to m-th sequencers VSEQ1 to VSEQm form a vertical scanning circuit. The first to m-th sequencers VSEQ1 to VSEQm are connected in series to each other. The j-th sequencer VSEQj has a sequencer input terminal in, a row operation completion signal input terminal rdy, a sequencer output terminal out, and a row selection signal output terminal Sel. A j-th vertical control signal clkv_j is input to the sequencer input terminal in. A row operation completion signal H_rdy is input to the row operation completion signal input terminal rdy. The sequencer output terminal out outputs a (j+1)-th vertical control signal clkv_j+1 when the row operation completion signal H_rdy is input to the row operation completion signal input terminal rdy after the j-th vertical control signal clkv_j is input to the sequencer input terminal in. The row selection signal output terminal Sel outputs a j-th row selection signal rdyv_j after the j-th vertical control signal clkv_j is input to the sequencer input terminal in.

The j-th sequencer VSEQj changes a level of the j-th row selection signal rdyv_j from "L" to "H" if the level of the j-th vertical control signal clkv_j which is input to the sequencer input terminal in is changed from "L" to "H". Consequently, the j-th row light receiving elements P_j_1 to P_j_n are activated. While the j-th row light receiving elements P_j_1 to P_j_n are activated, the first to n-th sequencers SEQ1 to SEQn sequentially perform a scanning operation, and thus photoelectric conversion signals are sequentially read from the j-th row light receiving elements P_j_1 to P_j_n.

If the level of the j-th vertical control signal clkv_j which is input to the sequencer input terminal in is changed to "H", and then the level of the row operation completion signal H_rdy which is input to the row operation completion signal input terminal rdy is changed from the "L" to "H", the j-th sequencer VSEQj changes a level of the (j+1)-th vertical control signal clkv_j+1 from "L" to "H", and also changes a level of the j-th row selection signal rdyv_j from "H" to "L". The row operation completion signal H_rdy is the same signal as the (n+1)-th horizontal control signal clkh_n+1. If all of the first to n-th amplifiers AMP1 to AMPn complete the amplification operations, a level of the (n+1)-th horizontal control signal clkh_n+1, that is, a level of the row operation completion signal H_rdy is changed from "L" to "H". Consequently, reading of j-th row photoelectric conversion signals is completed, and reading of (j+1)-th photoelectric conversion signals is started.

An m-th vertical control signal clkv_m output from the sequencer output terminal out of the m-th sequencer VSEQm is output to the AND gate AND2 as an operation completion signal fin. The AND gate AND2 has a first input terminal to which a signal obtained by inverting the operation completion signal fin is input, a second input terminal to which the (n+1)-th horizontal control signal clkh_n+1 is input, and an output terminal which outputs a signal to be input to the second input terminal of the OR gate OR1. The AND gate AND2 outputs, from the output terminal, a signal indicating a result of an AND operation between the operation completion signal fin which is input to the first input terminal and the (n+1)-th horizontal control signal clkh_n+1 which is input to the second input terminal. If a level of the m-th vertical control signal clkv_m, that is, the operation completion signal fin is changed from "L" to "H", the AND gate AND2 outputs a signal in "L". Consequently, reading of photoelectric conversion signals of all the rows is completed.

(Second Modification Example)

Figure 10A:
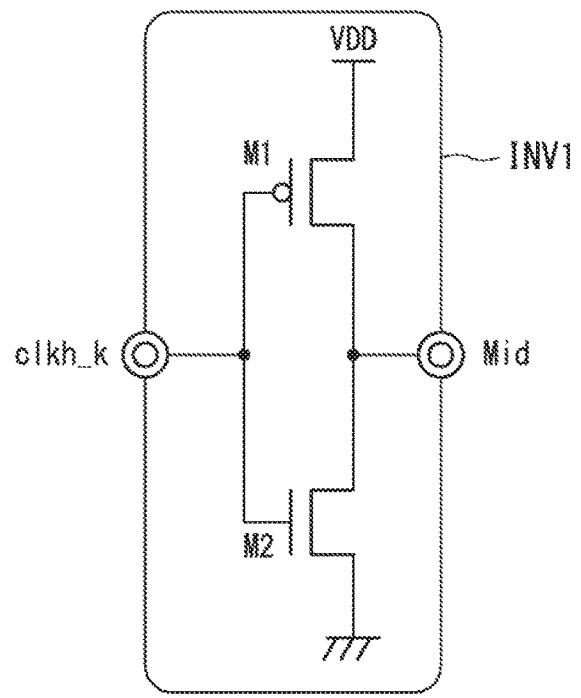
FIG. 10A is a circuit diagram showing a configuration of an inverter provided in a sequencer according to a second modification example of the embodiment of the present invention.

Next, with reference to FIGS. 10A and 10B, a description will be made of a second modification example of the embodiment of the present invention. FIG. 10A shows a general configuration as a configuration of the first inverter INV1 shown in FIG. 3. As shown in FIG. 10A, the first inverter INV1 includes a P-type first MOS transistor M1 and an N-type second MOS transistor M2. Gates of the first MOS transistor M1 and the second MOS transistor M2 are connected in common to the input terminal of the first inverter INV1. A drain of the first MOS transistor M1 and a drain of the second MOS transistor M2 are connected in common to the output terminal of the first inverter INV1. A source of the first MOS transistor M1 is connected to the power supply VDD. A source of the second MOS transistor M2 is connected to the ground.

Figure 10B:
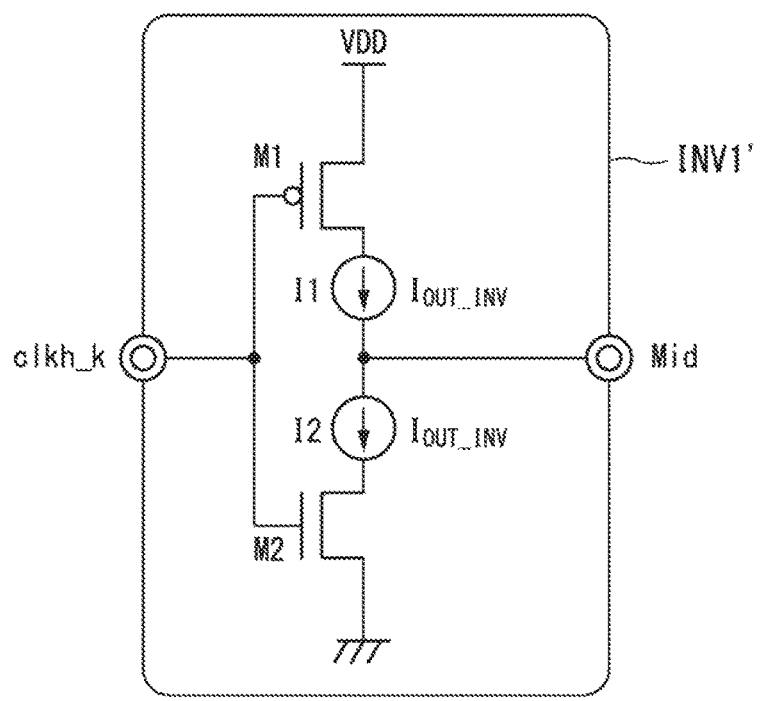
FIG. 10B is a circuit diagram showing a configuration of an inverter provided in the sequencer according to the second modification example of the embodiment of the present invention.

FIG. 10B shows a configuration of a first inverter INV1' which can be used instead of the first inverter INV1 shown in FIG. 3. As shown in FIG. 10B, in the first inverter INV1', a first constant current source I1 and a second constant current source I2 are added to the first inverter INV1 shown in FIG. 10A.

A first terminal of the first constant current source I1 is connected to the drain of the first MOS transistor M1. A second terminal of the first constant current source I1 and a first terminal of the second constant current source I2 are connected in common to the output terminal of the first inverter INV1'. A second terminal of the second constant current source I2 is connected to the drain of the second MOS transistor M2.

The output current capability of the first constant current source I1 and the second constant current source I2 are $I_{OUT\_INV}$. Compared with the configuration shown in FIG. 10A in which the output current capability greatly changes depending on a voltage of the k-th horizontal control signal clkh_k, in the configuration shown in FIG. 10B in which a change in the output current capability relative to a voltage of the k-th horizontal control signal clkh_k is small, it is possible to more accurately control time t_trans_k required in transition of logic.

As mentioned above, the embodiments of the present invention have been described in detail with reference to the drawings, but a specific configuration is not limited to the embodiments, and includes design changes and the like within the scope without departing from the spirit of the present invention. The present invention is not limited to the above description, and is limited by only the accompanying claims.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An image sensor comprising:
   n light receiving elements including a first light receiving element to an n-th light receiving element, each of the light receiving elements generating a photoelectric conversion signal corresponding to an amount of light which is incident to a light reception surface;
   n sequencers including a first sequencer to an n-th sequencer, each of the sequencers having a sequencer input terminal to which a k-th horizontal control signal is input, a pixel control signal output terminal which outputs a k-th pixel control signal after the k-th horizontal control signal is input to the sequencer input terminal, the k-th pixel control signal used for controlling to k-th light receiving element to output a signal in accordance with the photoelectric conversion signal, and a sequencer output terminal from which a (k+1)-th horizontal control signal is output after the k-th horizontal control signal is input to the sequencer input terminal; and
   n switches including a first switch to an n-th switch, each of the switches having a switch input terminal to which a signal corresponding to the photoelectric conversion signal generated by the k-th light receiving element is input, a switch control terminal to which a k-th pixel control signal based on the k-th horizontal control signal is input, and a switch output terminal which is electrically connected to the switch input terminal in accordance with the k-th pixel control signal which is input to the switch control terminal,
   wherein n is a natural number of 2 or more, and k is a natural number of 1 to n,
   wherein the first sequencer to the n-th sequencer are connected to each other in series such that the sequencer output terminal from which the (k+1)-th horizontal control signal is output, is connected to the sequencer input terminal to which the (k+1)-th horizontal control signal is input, and
   wherein in a sequence from the first sequencer toward the n-th sequencer, the output of the k-th pixel control signal and the output of the (k+1)-th horizontal control signal are sequentially repeated.

2. The image sensor according to claim 1, further comprising:
   n amplifiers including a first amplifier to an n-th amplifier, each of the amplifiers having an amplifier input terminal to which the photoelectric conversion signal generated by the k-th light receiving element is input, and an amplifier output terminal from which an amplified signal obtained by amplifying the photoelectric conversion signal is output after a predetermined processing time elapses from inputting of the photoelectric conversion signal to the amplifier input terminal,
   wherein the amplifier output terminal of the k-th amplifier is connected to the switch input terminal of the k-th switch, and
   wherein the k-th sequencer outputs the (k+1)-th horizontal control signal from the sequencer output terminal of the k-th sequencer after a predetermined delay time elapses from inputting of the k-th horizontal control signal to the sequencer input terminal of the k-th sequencer, and the predetermined delay time is equal to or larger than the predetermined processing time.

3. The image sensor according to claim 2, wherein a ratio of load capacitance to an inverse number of an average value of output current capability of a device constituting the k-th sequencer is equal to or higher than, by a predetermined value, a ratio of load capacitance to an inverse number of output current capability of a device constituting the k-th amplifier.

4. The image sensor according to claim 1, further comprising:

n amplifiers including a first amplifier to an n-th amplifier, each of the amplifiers having an amplifier input terminal to which the photoelectric conversion signal generated by the k-th light receiving element is input, an amplifier output terminal from which an amplified signal obtained by amplifying the photoelectric conversion signal which is input to the amplifier input terminal is output, and an amplifier completion terminal from which a k-th operation completion signal is output at a timing corresponding to a timing at which the amplified signal is output, wherein each of the first sequencer to the n-th sequencer further has an operation completion signal input terminal to which the k-th operation completion signal output from the k-th amplifier is input, wherein the amplifier output terminal of the k-th amplifier is connected to the switch input terminal of the k-th switch, and wherein the (k+1)-th sequencer outputs a (k+1)-th pixel control signal from the pixel control signal output terminal of the (k+1)-th sequencer and outputs a (k+2)-th horizontal control signal from the sequencer output terminal of the (k+1)-th sequencer based on a timing at which the k-th operation completion signal output from the k-th amplifier is input, and stops outputting of the (k+2)-th horizontal control signal from the sequencer output terminal of the (k+1)-th sequencer based on a timing at which the (k+1)-th operation completion signal output from the (k+1)-th amplifier is input.

5. The image sensor according to claim 4, further comprising:

a selector that has a selector input terminal connected to the amplifier completion terminals of the first to n-th amplifiers, and a selector output terminal outputting a data acquisition signal if the operation completion signal output from any one of the first to n-th amplifiers is input to the selector input terminal; and an AD converter that has an AD input terminal connected to the switch output terminals of the first to n-th switches, an AD control terminal connected to the selector output terminal, and an AD output terminal outputting a signal obtained by performing AD conversion on a signal which is input to the AD input terminal when the data acquisition signal is input to the AD control terminal.

6. The image sensor according to claim 5, wherein, the AD converter samples a signal which is input to the AD input terminal so as to convert the signal into a digital signal from an analog signal, and outputs the digital signal from the AD output terminal, only when the data acquisition signal is valid.

7. The image sensor according to claim 1, wherein the k-th sequencer operates only in a period from the input of the k-th horizontal control signal and the output of the (k+1)-th horizontal control signal.

* * * * *